United States Patent
Spurlock et al.

(10) Patent No.: US 9,906,537 B2
(45) Date of Patent: *Feb. 27, 2018

(54) SYSTEM, METHOD, AND COMPUTER PROGRAM PRODUCT FOR CONDITIONALLY PERFORMING AN ACTION BASED ON AN ATTRIBUTE

(71) Applicant: McAfee, Inc., Santa Clara, CA (US)

(72) Inventors: Joel R. Spurlock, Portland, OR (US); Gregory William Dalcher, Tigard, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,037

(22) Filed: Jan. 12, 2015

(65) Prior Publication Data

US 2015/0256549 A1 Sep. 10, 2015

Related U.S. Application Data (63) Continuation of application No. 12/898,649, filed on Oct. 5, 2010, now Pat. No. 8,935,792.

(51) Int. Cl.
- *G06F 21/00* (2013.01)
- *H04L 29/06* (2006.01)
- *G06F 21/52* (2013.01)
- *G06F 21/57* (2013.01)
- *G06F 21/62* (2013.01)

(Continued)

(52) U.S. Cl.
CPC .......... *H04L 63/1408* (2013.01); *G06F 21/52* (2013.01); *G06F 21/54* (2013.01); *G06F 21/57* (2013.01); *G06F 21/577* (2013.01); *G06F 21/604* (2013.01); *G06F 21/6218* (2013.01); *H04L 67/10* (2013.01); *G06F 2221/2141* (2013.01)

(58) Field of Classification Search
CPC . H04L 63/1408; H04L 67/10; H04L 63/1433; H04L 63/1416; G06F 21/577; G06F 21/52; G06F 21/54; G06F 21/57; G06F 21/604; G06F 21/6218; G06F 2221/2141
USPC .......................................................... 726/25
See application file for complete search history.

(56) References Cited

U.S. PATENT DOCUMENTS

| | | | |
|---|---|---|---|
| 6,173,404 B1 * | 1/2001 | Colburn | G06F 21/54 707/999.103 |
| 6,973,578 B1 * | 12/2005 | McIchionc | G06F 21/563 713/188 |

(Continued)

OTHER PUBLICATIONS

Zhaojun, Gu et al., Research of Security Event Correlation based on Attibute Similarity, International Journal of Digital Content Technology and its Applications, Jun. 2011, pp. 222-228, vol. 5, No. 6, School of Computer Science and Technology, Civil Aviation University of China, Tianjin, 300300, China.

*Primary Examiner* — Mahfuzur Rahman
*Assistant Examiner* — Narciso Victoria
(74) *Attorney, Agent, or Firm* — Blank Rome, LLP (57) ABSTRACT

A system, method, and computer program product are provided for conditionally performing an action based on an attribute. In use, at least one attribute associated with an object is determined. Additionally, an event associated with the object is identified. Further, at least one action is conditionally performed in association with the event, based on the at least one attribute.

12 Claims, 8 Drawing Sheets

(51) Int. Cl.
    *G06F 21/54*     (2013.01)
    *G06F 21/60*     (2013.01)
    *H04L 29/08*     (2006.01)

(56) References Cited

U.S. PATENT DOCUMENTS

| | | |
|---|---|---|
| 7,861,296 B2 | 12/2010 | Costea et al. |
| 8,935,792 B1 | 1/2015 | Spurlock et al. |
| 9,117,077 B2 * | 8/2015 | Mircescu ................ G06F 21/56 |
| 2005/0223239 A1 * | 10/2005 | Dotan ..................... G06F 21/52 |
| | | 713/188 |
| 2006/0218637 A1 * | 9/2006 | Thomas ................. G06F 21/51 |
| | | 726/23 |
| 2013/0247190 A1 | 9/2013 | Spurlock |

* cited by examiner

SYSTEM, METHOD, AND COMPUTER PROGRAM PRODUCT FOR CONDITIONALLY PERFORMING AN ACTION BASED ON AN ATTRIBUTE

TECHNICAL FIELD

The present invention relates to performance optimization, and more particularly to minimizing an amount of performed actions.

BACKGROUND ART

Traditionally, many modern processes involve an analysis of a large number of time-consuming events. For example, a malware protection model may require file scans of thousands of objects, where each scan requires five to ten milliseconds of processing time for a local scan and two hundred to four hundred milliseconds of processing time for a cloud lookup scan. However, traditional methodologies for minimizing an amount of these time-consuming analyses have generally exhibited various limitations.

For example, traditional analysis minimization methodologies such as caching scanned objects and events may not function for events such as write scans. Additionally, such traditional analysis minimization methodologies may not work well on objects that frequently change, as new analysis may be always required for such objects. Further, such traditional analysis minimization methodologies may have an associated cost (e.g., cache lookup) that may result in reduced overall analysis performance. There is thus a need for addressing these and/or other issues associated with the prior art.

SUMMARY

A system, method, and computer program product are provided for conditionally performing an action based on an attribute. In use, at least one attribute associated with an object is determined. Additionally, an event associated with the object is identified. Further, at least one action is conditionally performed in association with the event, based on the at least one attribute.

DESCRIPTION OF EMBODIMENTS

Figure 1:
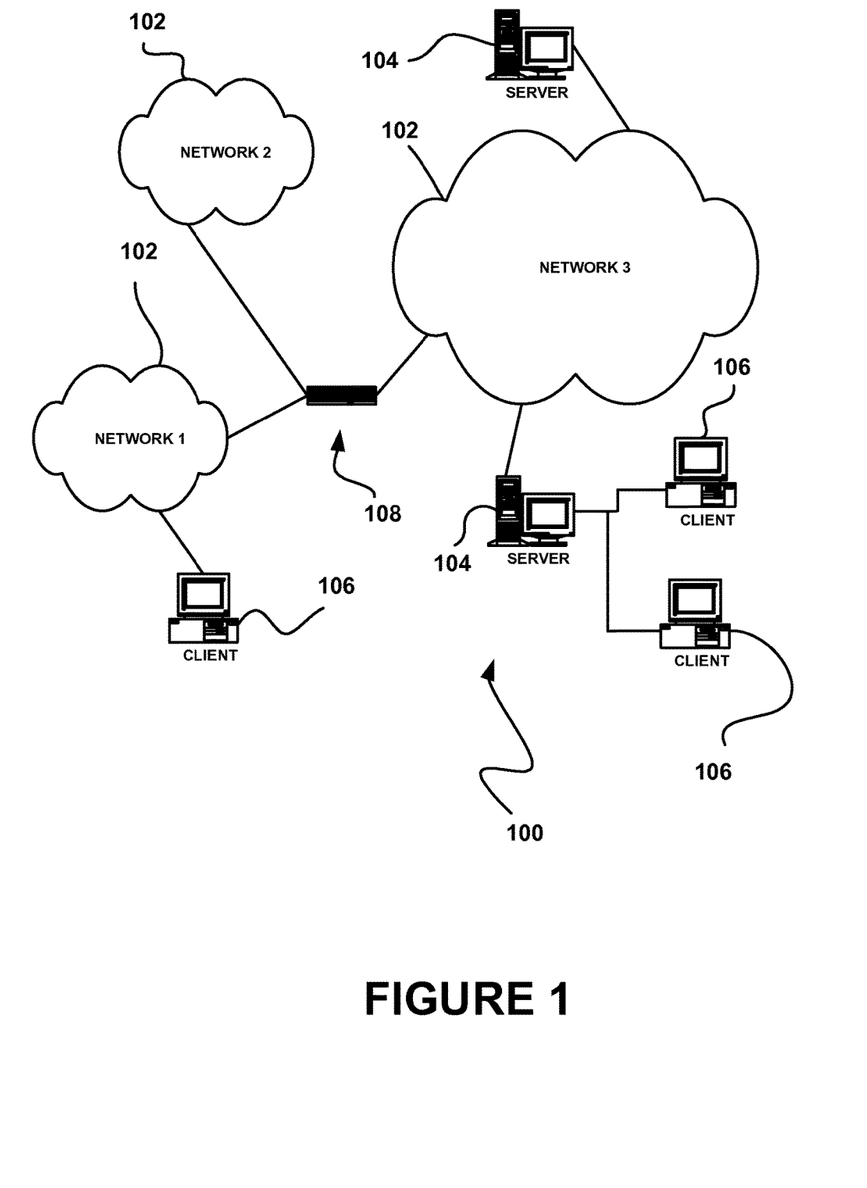
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
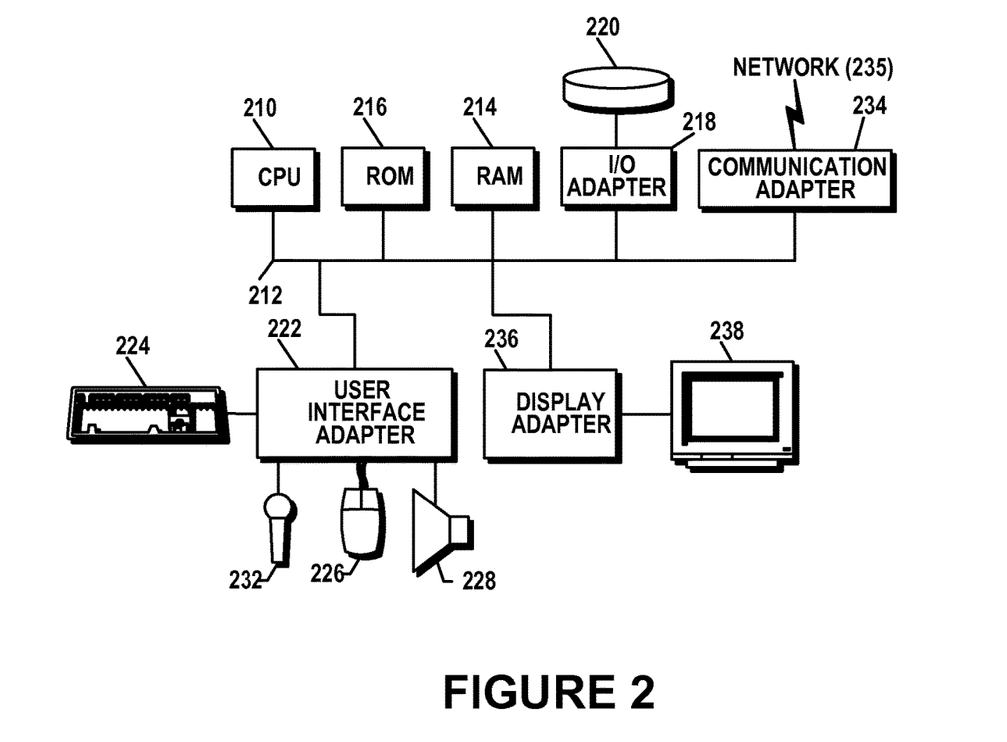
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
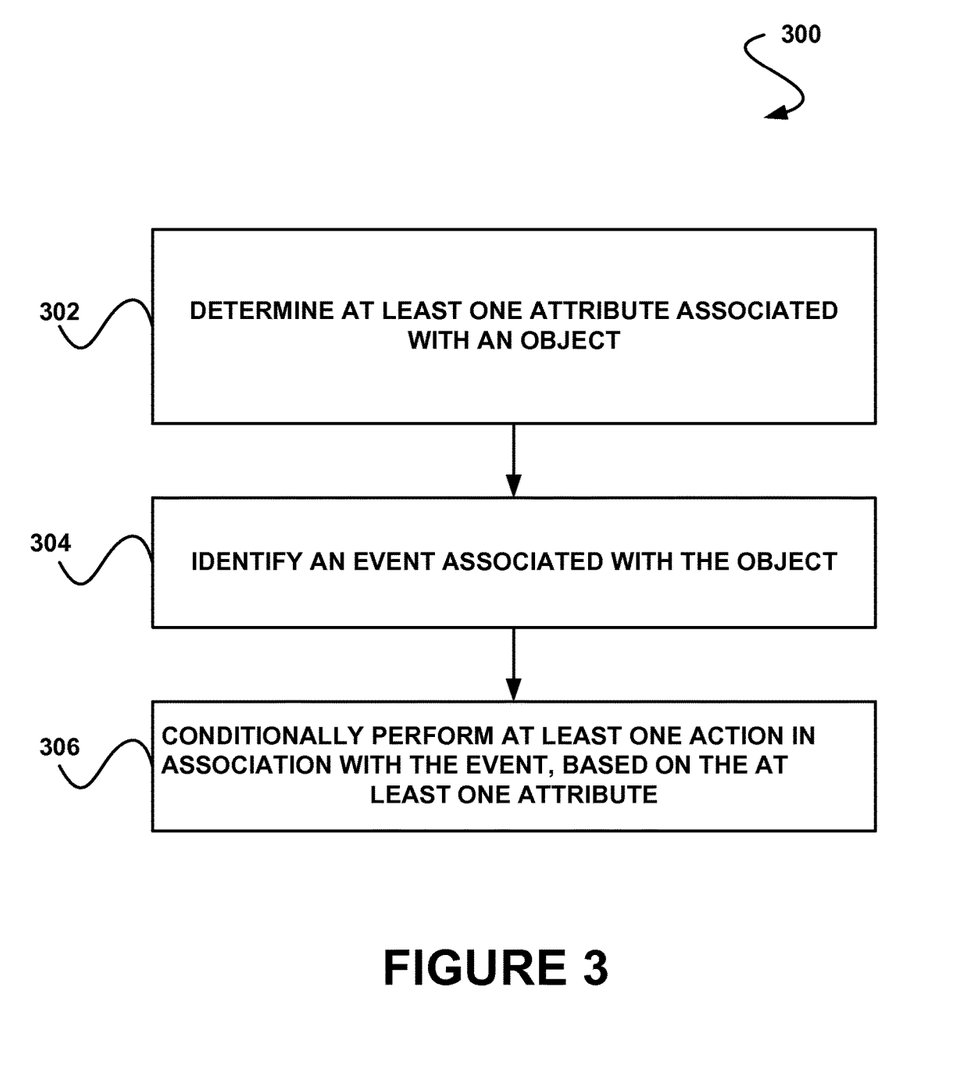
FIG. 3 shows a method for conditionally performing an action based on an attribute, in accordance with another embodiment.

FIG. 3 shows a method 300 for conditionally performing an action based on an attribute, in accordance with another embodiment. As an option, the method 300 may be carried out in the context of the architecture and environment of FIGS. 1 and/or 2. Of course, however, the method 300 may be carried out in any desired environment.

As shown in operation 302, at least one attribute associated with an object is determined. In one embodiment, the object may include a file. For example, the object may include an electronic mail message, a text document, a registry entry, etc. In another embodiment, the object may include a process. For example, the object may include a web browser, a word processing program, an electronic mail message program, etc.

Additionally, the at least one attribute may include any attribute that can be associated with the object. In one embodiment, the at least one attribute may include an indication of an amount of trust associated with that object. For example, the at least one attribute may include a trust state of trusted, untrusted, distrusted, trusted updater, etc. In another embodiment, the at least one attribute may include a reputation associated with the object. In yet another embodiment, the at least one attribute may include an indication of an interaction associated with the object. For example, the at least one attribute may include an indication that the object is internet facing (e.g., interacts with one or more external resources, etc.).

Further, in one embodiment, the at least one attribute may be determined based on a scan on the object. For example, the object may be scanned for malware. In another example, a digital signature may be determined and/or examined for the object. In yet another example, a cloud validation may be performed for the object. In still another example, a file inspection and/or a behavioral inspection may be performed on the object. In another example, one or more hashes may be determined and/or examined for the object. Of course, however, the scan may be performed on the object in any manner. In this way, trust may be established for the object based on the scan. For example, if the scan performed on the object indicates that the object is trustworthy (e.g., not malicious, free of malware, not corrupt, etc.), then an attribute indicating that the object is trusted may be associated with the object.

Further still, in one embodiment, the at least one attribute may be determined by associating an attribute of an additional object with the object, based on a relationship between the additional object and the object. For example, the object may inherit an attribute from the other object, based on the relationship between the additional object and the object. For instance, determining the at least one attribute may include determining whether the object was created by another object with the attribute. For instance, it may be determined whether the object was created by another object with an attribute indicating that the other object is trusted. Additionally, in one embodiment, the object may inherit the attribute from the other object with the attribute when the object was created by the other object.

Also, in another embodiment, the at least one attribute may be determined by altering an existing attribute of the object, based on one or more criteria. For example, an attribute indicating that the object is trusted may be revoked (e.g., changed to untrusted, distrusted, etc.) if it is determined that one or more events occurred involving the object. For instance, such events may include the object being modified or otherwise manipulated by an untrusted object, the object being opened for modification by the untrusted object, the trusted object loading one or more untrusted objects, etc.

In another embodiment, the at least one attribute may be determined utilizing a threshold. For example, one or more elements associated with the object (e.g., object scan results, object creation, object interaction) may be compared against a threshold in order to determine an attribute of the object. In yet another embodiment, the threshold may be determined by a user.

Additionally, as shown in operation 304, an event associated with the object is identified. In one embodiment, the event may include an action that is performed by the object. For example, the event may include an object accessing (e.g., reading, writing, loading, etc.) one or more additional objects, sending or receiving one or more additional objects (e.g., on a network, etc.), etc. In another embodiment, the event may include an alteration of the object. For example, the event may include the object being accessed by another object, being written to by another object, etc. In yet another embodiment, the event may include code execution. In still another embodiment, the event may include process memory.

Additionally, in one embodiment, the event may include a scan of the object. For example, the event may include a scheduled malware scan that includes a scan of the object. In another embodiment, the event may include sending or receiving the object. For example, the object may be sent or received on a network as part of network traffic. Additionally, in another embodiment, the event associated with the object may be identified as a result of monitoring the object or any other object. For example, the event associated with the object may be identified by monitoring an internal program structure (e.g., monitoring an emulation of a sample, etc.), monitoring internal and/or external operations on a system (e.g., a network, a file system, configuration database updates, etc.), etc.

Further, as shown in operation 306, at least one action is conditionally performed in association with the event, based on the at least one attribute. In one embodiment, the at least one action may include inspecting the event. In another embodiment, the at least one action may include inspecting the object. For example, the at least one action may include scanning the object (e.g., for malware, etc.). In another embodiment, the at least one action may be performed if the at least one attribute indicates that the object is not trusted. Further still, in one embodiment, the at least one action may not be performed if the at least one attribute indicates that the object is trusted.

In this way, a number of actions performed in association with the event may be reduced, which may decrease an amount of required processing necessary when many events are identified over a period of time. Additionally, the conditional performance of write scans may be provided, and a variety of ways to determine object attributes are supported.

Figure 4:
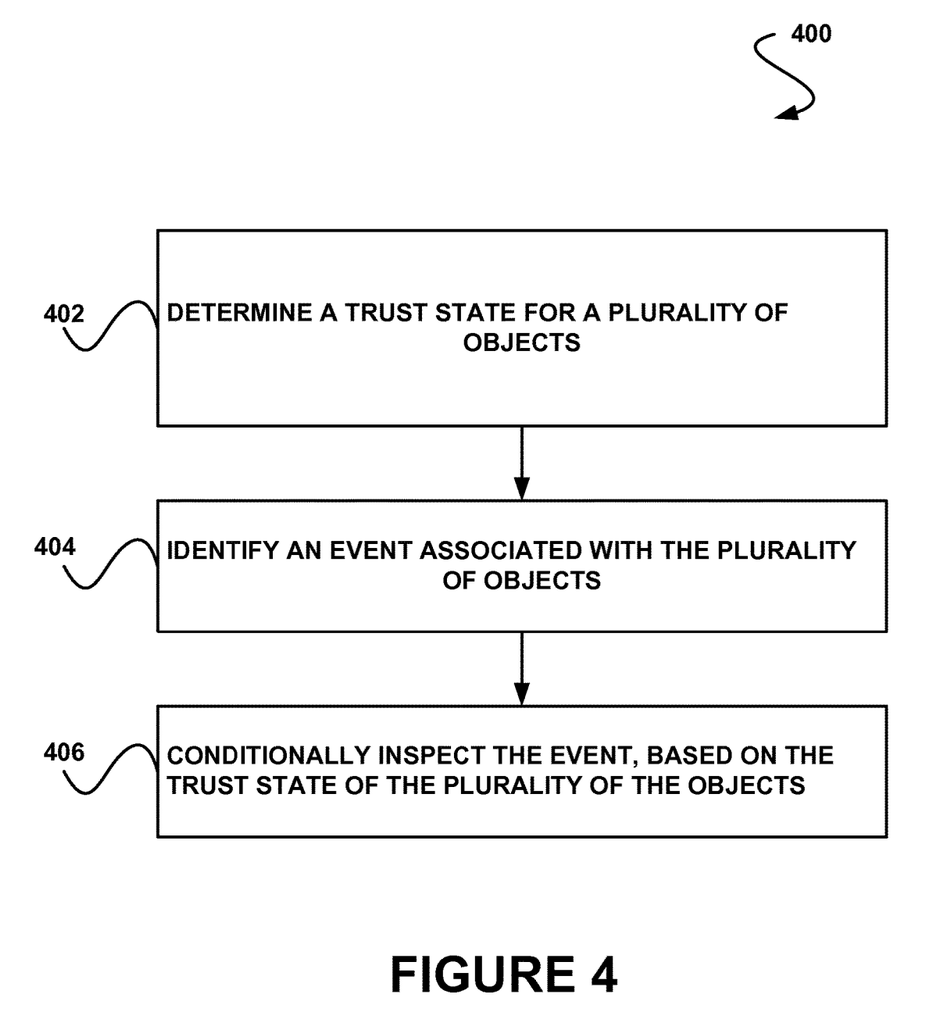
FIG. 4 shows a method for conditionally performing a scan of an object based on a trust state of the object, in accordance with yet another embodiment.

FIG. 4 shows a method 400 for conditionally performing a scan of an object based on a trust state of the object, in accordance with another embodiment. As an option, the method 400 may be carried out in the context of the architecture and environment of FIGS. 1-3. Of course, however, the method 400 may be carried out in any desired environment.

As shown in operation 402, a trust state is determined for a plurality of objects. In one embodiment, there may be several different trust states that an object can be in. For example, the trust states of an object may include a trusted state (e.g., trust has been determined or inherited), an untrusted state (e.g., trust has yet to be determined), a distrusted state (e.g., object explicitly has no trust), etc. Additionally, there may be several additional attributes that may be applied to an object. For example, an attribute may identify the object as a trusted updater if the object (e.g., a file, process, etc.) is known to update other objects on the system in a trusted way.

In another example, an attribute may identify the object as internet facing if the object interacts with one or more external resources (e.g., a network) in a way that engenders additional risk as new objects can be brought into the system. In another embodiment, the attribute may identify the object as internet facing if the object is a process that interacts with virtual machines, etc, where the term "network" represents a host or another virtual machine.

Additionally, in one embodiment, determining the trust state of the object may include establishing trust for the object. For example, trust may be established through content (e.g., antivirus (AV) scanning, etc.). In another embodiment, determining the trust state of the object may include the use of digital signatures, cloud validation, file inspection, hashes, behavioral inspection, whitelists, fingerprints, behavioral content analysis, etc.

In yet another embodiment, trust may be established at a process launch by verifying the trust of the process launching and the trust of all the embedded modules. Although the data may be cached and retrieved once trust is established, when no information is cached additional modules including the main process module may be scanned at process launch.

Further, in one embodiment, determining the trust state of the object may include determining whether trust is inherited by the object. For example, trust may be inherited during process creation from a file which is also trusted. In another example, trust may be inherited during creation of a new file from a trusted non internet facing process. In yet another example, if a trusted process which is also a trusted updater creates a new file, that file may in turn be trusted, etc. For instance, an installer component (e.g., MSIExec®, etc.) installing an Internet browser (e.g., Firefox®, etc.) which is a trusted binary adds new files to the system, which may then become trusted. In another embodiment, trusted processes which are determined to be internet facing may not confer trust onto their children as this may create a security gap.

Further still, in one embodiment, determining the trust state of the object may include revoking trust for the object. In another embodiment, behavioral content may be a primary mechanism for revoking trust. In yet another embodiment, there may be several mechanisms for distrusting, such as identifying untrusted processes opening a trusted process for modification (and being allowed to do so), identifying untrusted processes modifying a trusted process, identifying a trusted process loading untrusted libraries, identifying a trusted process loading distrusted content, identifying trusted processes contacting an untrusted domain, etc.

In another embodiment, a security solution may opt to increase performance by taking a higher amount of risk by increasing a number of trust mechanisms. For example, the security solution may allow a consumer to define trust, which may allow the consumer to tailor the trust to their environment. Additionally, in another embodiment, domain reputation may be used to identify when internet facing objects may be provided with increased trust. For example, an object determined to be trusted and internet facing when accessing a trusted domain may result in the object (e.g., a process, etc.) being treated as a trusted non internet facing rather than being treated as a more risky internet facing object.

Also, in one embodiment, a behavioural state machine may be used to manage one or more state transitions in order to determine a trust state for an object. For example, the behavioural state machine may perform one or more functions, including determining an initial state of an object (e.g., a suspicious state, a trusted state (e.g., a state on a white list, etc.), a white updater state, an entry process state, etc.), establishing relationships between objects to determine a spread of suspiciousness, managing inheritance of states and attributes between objects (like file to process), etc. Additionally, see, for example, U.S. patent application Ser. No. 12/202,952 filed Sep. 2, 2008, and U.S. patent application Ser. No. 12/177,601 filed Jul. 22, 2008, which are hereby incorporated by reference in their entirety, and which describe exemplary behavioural state machines.

In another embodiment, elements of inheritance may be implemented in a normalization phase to handle state and attribute inheritance between a file and a process. For example, it may be asserted that a process inherits all the states attributes of its main module, such that if an executable program is a file with the attribute of internet facing, then any process launched from the executable program would also have the attribute of internet facing.

Additionally, in one embodiment, the file to process relationship may not necessarily map the other direction. For example, all attributes and states may not be inherited from a process to a file. This may be managed by determining that the process was modified and setting that state. This may revoke the trust of the application. Further, in another embodiment, if a new process was discovered, or a process create event occurred, the normalization may copy states and attributes of a file to the process.

In another embodiment, it may be determined whether an object is suspicious due to the actions of another suspicious process. For instance, a file created by a suspicious process may have the state suspicious applied to it.

Further, in one embodiment, the behavioural state machine may establish one or more relationships between the plurality of objects. For example, in the scenario where Process A creates file B, a relationship may be created such that B's parent is now A. And if A was considered suspicious, B may be suspicious as it is now related to A. In another embodiment, a behavioural system via content may receive new "events" through user mode hooking which may result in alterations to a state machine. In another embodiment, these may support new technologies that are released, newer operating systems, newer software development kits (SDKs), etc.

In yet another embodiment, content may make fine tuned changes to the state machine to exclude unnecessary changes from it. For example, when processes start, and they have a user interface (UI), several registry keys may be modified that are not determined to be interesting or valuable to track. Additionally, content may generate exclusions for these in order to optimize performance.

In addition, in one embodiment, an initial function of the behavioural state machine may include a determination of suspiciousness. In effect, these may be objects which have never been seen before, and may not be on the white list. This may be implemented in or outside of content. Furthermore, these may be called "source" rules and may provide the context to allow discovery of (for example) an internet facing application downloading and executing malware. It may set the resultant objects state to "suspicious" as the entry point to the state machine.

In yet another embodiment, researchers may make new "source" rules in content to catch items that were not seen before which were suspicious. This optimization may reduce the performance impact and memory impact of having the system maintain active records for every object on the system (e.g., to determine what is "new," etc.). Further, generic "source" rules may include those which identify new binaries coming from internet facing processes as suspicious. This may not be application specific so it may work for any browser, a hacked version of svchost, or any other application which is contacting a resource external to the local machine.

Further still, in one embodiment, these could be coded one or more types of code. In another embodiment, one or more rules may require a multistate transition, and the effects may be bound with the normalization phase to determine persistence correctly. Also, in one embodiment, the relationships may be defined by a state machine. Although they may be defined in any code, the elements of the state machine may be filtered over time to reduce memory impact. These kinds of filters may be content driven. For example, the filters may exclude changes to registry keys that frequently change but have no bearing on the detection repair or threat intelligence registry keys which may be generated by any application that has a user interface. Additionally, these changes may not be maintained in the security exception or the data store as they may have no bearing on the detection or repair or threat intelligence. These kinds of changes may be identified over time, and are well suited to a content driven development model.

Additionally, as shown in operation 404, an event associated with the plurality of objects is identified. Further, as shown in operation 406, the event is conditionally inspected, based on the trust state of the plurality of the objects. In one embodiment, there may be several rules for event inspection which exist to avoid scans. For example, when a trusted object that is non internet facing is reading a file which is not distrusted, the event may require no inspection. In another example, when a trusted object that is internet facing is reading a trusted object, the event may require no inspection. In yet another example, when a trusted object that is non internet facing is writing a file which is not distrusted, the event may require no inspection.

Additionally, in one embodiment, the above method may be used to target specific types of scans, or reduced scanning Additionally, in another embodiment, the above rules may also be applied to restricting to certain types of scans. For example, objects coming from internet facing processes may require scans for exploit analysis, or may be scanned with different options. Further, the above rules may also be applied to execute only a subset of antivirus (AV) signatures based on the trust level of the process.

In this way, the aforementioned methodology may function on write scans, and may not be not subject to exploit problems (e.g., exploit problems faced by a verified trusted process (VTP) mechanism, etc.). Additionally, the aforementioned methodology may offer a reduction in scans over other implementations (e.g., verified trusted process (VTP) mechanisms, and caching of inspected objects and events, etc.). Further, the aforementioned methodology may include ways to determine process trust, including the use of fingerprints, digital signatures, md5s, cloud queries, behavior, etc. Further still, the aforementioned methodology may be content driven such that it may improve over time and keep pace with a cost of implementing a scan.

Further, in one embodiment, some state transitions for a full system may require hooks. For example, a load library may be implemented using user mode hooking It may be possible to get equivalence from a kernel. It may be present to preserve the integrity of the whitelist. In another example, a write process memory and/or create remote thread may be required for behavioral state transitions. Additionally, this may also be frequently used by malware. An equivalent event may be required for the scan avoidance state transitions. In yet another example, it may be required to use an open process event to achieve equivalent functionality for when user mode hooking is not present.

In another embodiment, to achieve scan avoidance without user mode hooking there may be two alternatives to supplement a loss of CreateRemoteThread and WriteProcessMemory, which may represent the modification of a process that revokes trust. They may also function well in tandem. In another embodiment, this implementation may be presented to the point product as options ("Protect trusted processes") which may enable the first item below, and if this is not enabled the more conservative second item may be used. In the first item, a function may be implemented to strip modify permissions when a non white process (or optionally a suspicious process) opens a handle to a white process with modify permissions. This may preserve processes that have been identified as trusted.

This mechanism may have significant advantages as it may neuter number of prevalent and potent malware families affecting them unable to spread. It may be considered however that this event may also be used to detect behaviorally, so publishing may not be suppressed. Additionally, in the second item, a function may be implemented to revoke trust on a process when a non white process opens a white process with modify permissions.

In yet another embodiment, scan avoidance may be utilized. In one embodiment, scan avoidance may include a cache and may protect against internet facing applications and content. Additionally, scan avoidance may function on a model that if a trusted application is creating a file or reading a file, then given appropriate circumstances that event may be ignored, and scanning may not be necessary. This may not necessarily mean that the resultant file is "trusted", but is akin to scanning with AV and getting no result. In another embodiment, processes which are untrusted or which have their trust revoked may get full inspection by AV scanning, including their subsequent I/O. In another embodiment, avoiding a scan may not necessarily equate to full trust of the file.

In yet another embodiment, processes which are outward facing (and which may be referred to as internet facing, but not restricted to such) or processes which can be an entry point of new code or content into the system may have additional inspection. Additionally, scan avoidance may include a strong trust revocation mechanism and may be stateful. Further, trust for a process may be established when it is launched if it has not been identified and cached prior. For example, if an application writes a new binary to disk and that binary does not get scanned during this operation due to trust rules, that binary may require establishing of trust during its launch phase, which includes inspection by AV, trust content etc.

Further, in one embodiment, one mechanism outlined in the scan avoidance algorithm may be that of the trusted updater. This may allows the client to execute behavioral content and determine that the children of an object can also be trusted. Use cases may include Windows® update, trusted installers, etc.—when one or more modify or creates files on disk, those files may also be trusted.

There are protections against a compromise of a trusted updater, both from the content space and from the infrastructure. For example, if a trusted updater is modified or loads/interprets untrusted libraries the trusted updater state for that process instance may be revoked. Additionally, content may need to assess when identifying a process as a trusted updater that it is a secure application. For example, trusting a non-authenticated downloader may create a risk that could cause the downloader to retrieve malware when it tries to receive an application update. Appropriate analysis may need to be done on any application that would be identified as a trusted updater.

In this way, a trust state may be created for an object that may be used when applying other technologies, such as scans, inspection, etc., in order to avoid resource-intensive application of such technologies.

Figure 5:
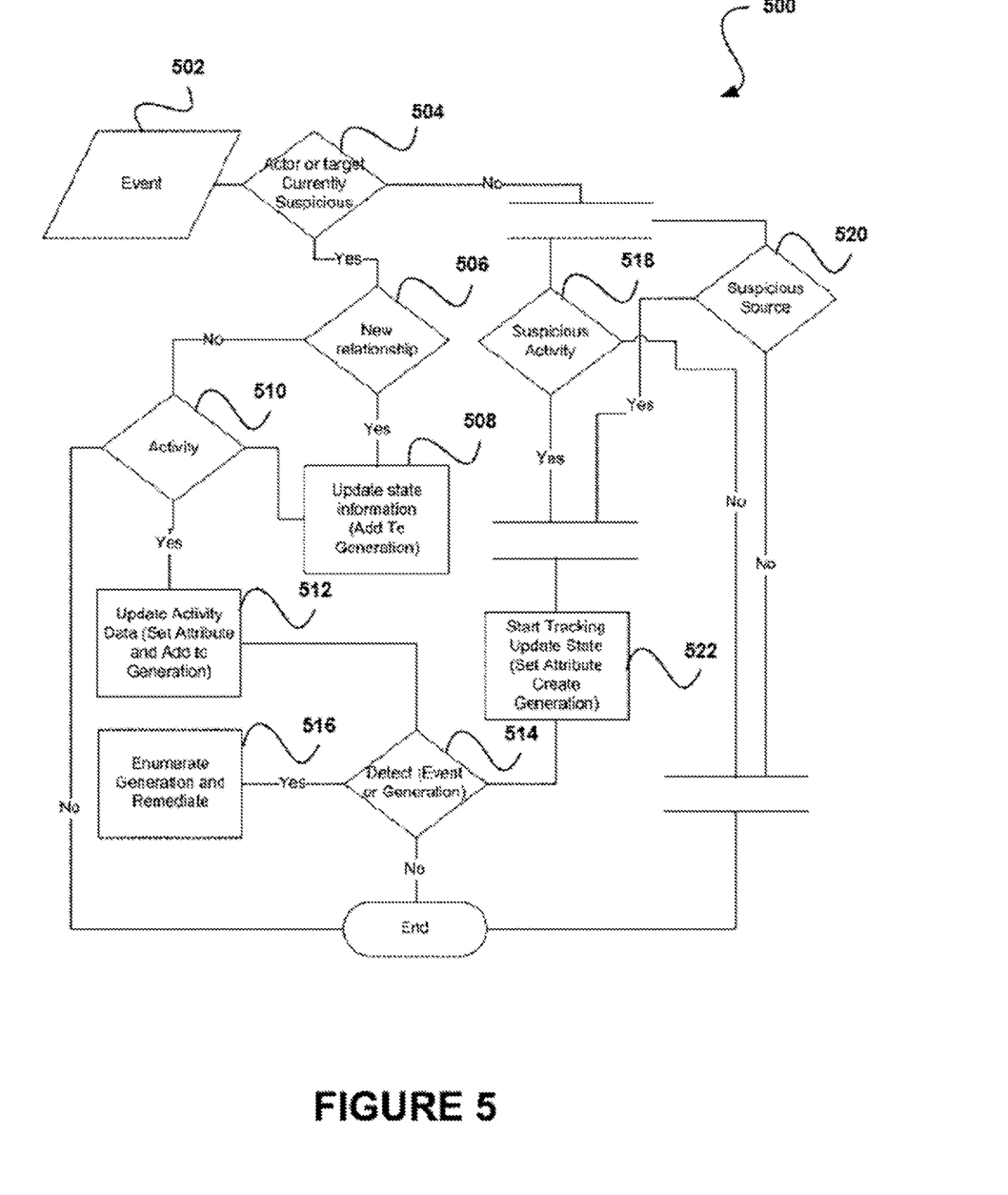
FIG. 5 shows a method for applying event processing logic to an event that is scanned, in accordance with still another embodiment.

FIG. 5 shows a method 500 for applying event processing logic to an event that is scanned, in accordance with another embodiment. As an option, the method 500 may be carried out in the context of the architecture and environment of FIGS. 1-4. Of course, however, the method 500 may be carried out in any desired environment.

As shown in operation 502, it is determined that an event has occurred. Additionally, in decision 504 it is determined whether an actor or target associated with the event is currently regarded as suspicious. If in decision 504 it is determined that an actor or target associated with the event is currently regarded as suspicious, then in decision 506 it is determined whether the relationship between the actor and target is a new relationship. If in decision 506 it is determined that the relationship between the actor and target is a new relationship, then state information is updated (e.g., added to a generation) in operation 508, and the method proceeds to decision 510.

If in decision 506 it is determined that the relationship between the actor and target is not a new relationship, then in decision 510 it is further determined whether an activity is associated with the event. If in decision 510 it is determined that the activity is not associated with the event, then the method ends and no further action is taken. However, if in decision 510 it is determined that the activity is associated with the event, then in operation 512 activity data is updated (e.g., an attribute is set and added to a generation). Additionally, in decision 514 it is determined whether an event or generation is detected. If in decision 514 it is determined that an event or generation is not detected, then no further action is taken. However, if in decision 514 it is determined that an event or generation is detected, then in operation 516 the generation is enumerated and remediation is performed.

If in decision 504 it is determined that an actor or target associated with the event is not currently regarded as suspicious, then in decisions 518 and 520 it is determined whether a suspicious activity or suspicious source are detected, respectively. If in decisions 518 and 520 it is determined that a suspicious activity and/or suspicious source are not detected, then no further action is taken. However, if in decisions 518 and 520 it is determined that a suspicious activity and/or suspicious source are detected, then in operation 522 tracking of an update state is started, an attribute is set, and a generation is created, and the method proceeds to decision 514.

In one embodiment, each of the above method steps may be determined by one or more drivers or conditional checks within drivers. Additionally, negative drivers may be used to prevent unwanted analysis or filter results. Further, during the analysis of events it may be necessary to determine if any event results in a new object being added to the generation. Further still, as items are recorded into a generation, if any object changes disposition, that object may be recorded into the generation.

As part of the relationship tracking the disposition of the object (whether it was created, previously existed, or was deleted) may also be determined. If objects are deleted as part of a suspicious activity, a backup may be made in order to facilitate repair. Should a generation be 'aged' out, the backups may be deleted.

Figure 6:
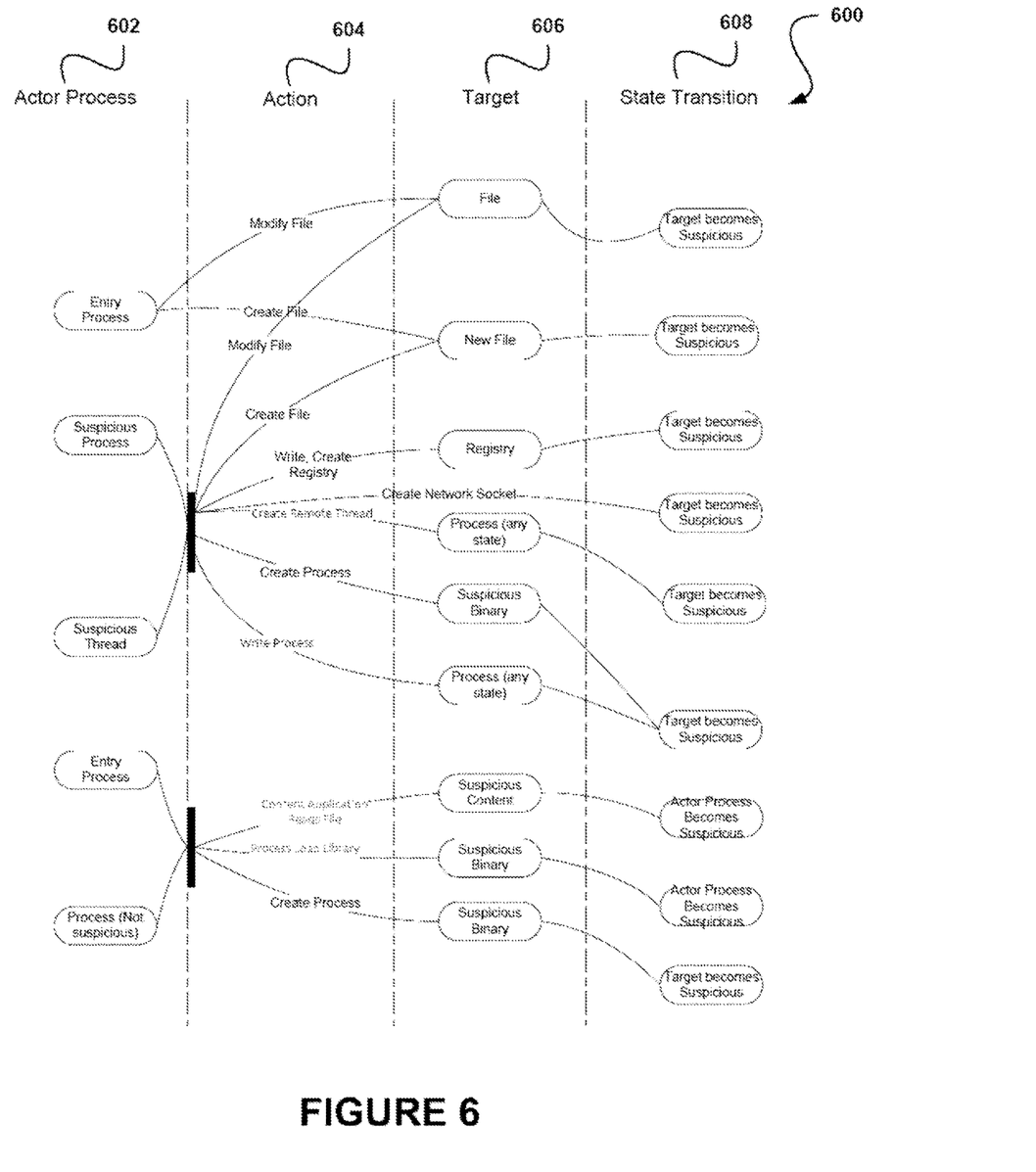
FIG. 6 shows an exemplary state model for establishing a trust state, in accordance with another embodiment.

FIG. 6 shows an exemplary state model 600 for establishing a trust state, in accordance with another embodiment. As an option, the model 600 may be carried out in the context of the architecture and environment of FIGS. 1-5. Of course, however, the model 600 may be carried out in any desired environment.

As shown, a plurality of actor processes 602, and targets 606 are mapped to state transitions 608 based on their related actions 604. In one embodiment, trust may be determined by a process being "white" (e.g., on a whitelist, etc.), but not "suspicious." In this way, applying a "suspicious" state to a process may revoke trust for that process.

Figure 7:
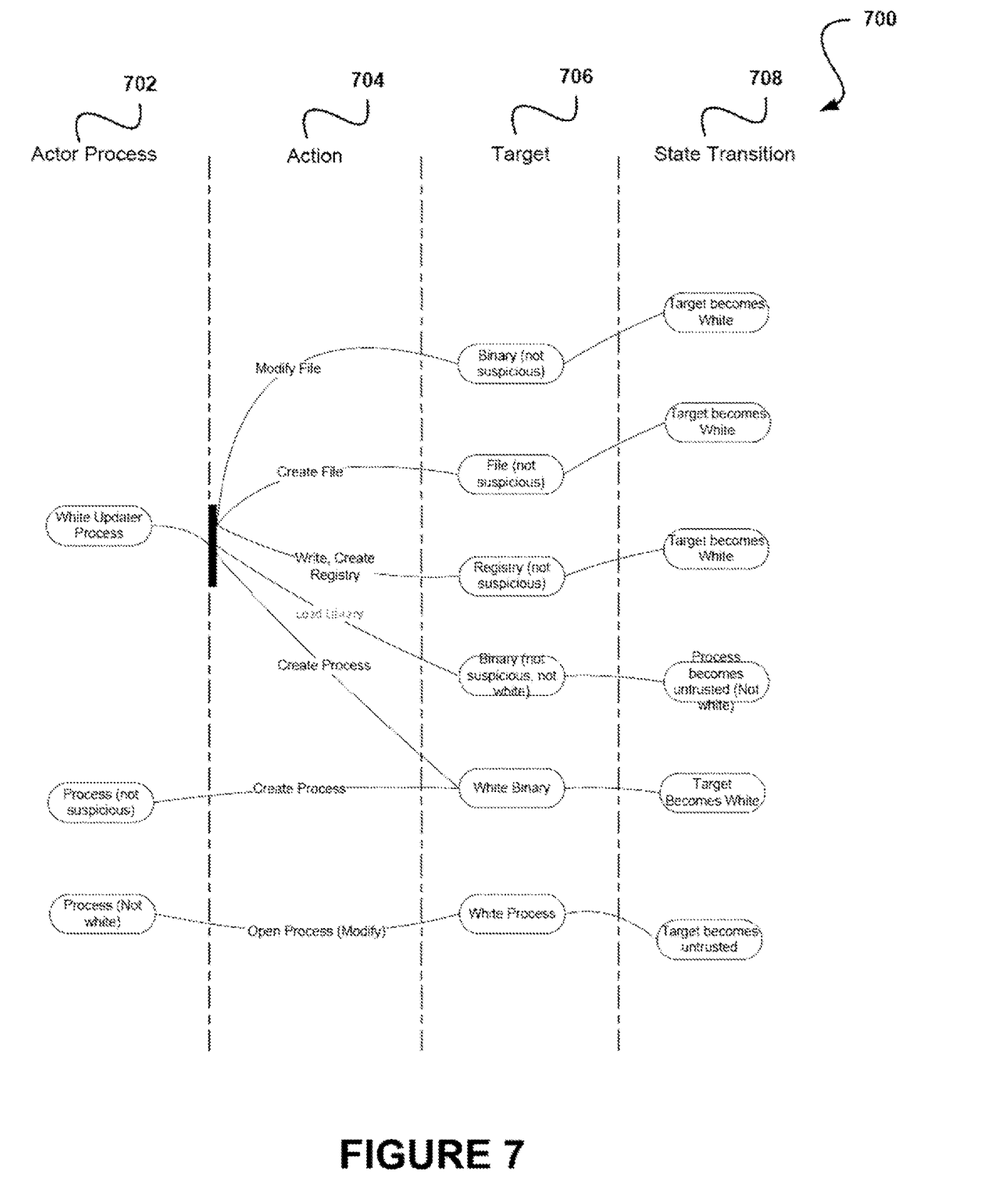
FIG. 7 shows an exemplary state model for monitoring system behavior, in accordance with yet another embodiment.

FIG. 7 shows an exemplary state model 700 for monitoring system behavior, in accordance with another embodiment. As an option, the model 700 may be carried out in the context of the architecture and environment of FIGS. 1-6. Of course, however, the model 700 may be carried out in any desired environment.

As shown, a plurality of actor processes 702, and targets 706 are mapped to state transitions 708 based on their related actions 704. In this way, it may be determined whether trust is inherited or revoked based on the actions 704. In one embodiment, modify permissions may be stripped from a suspicious process opening a white process. In another embodiment, a white process may include an entry process.

Figure 8:
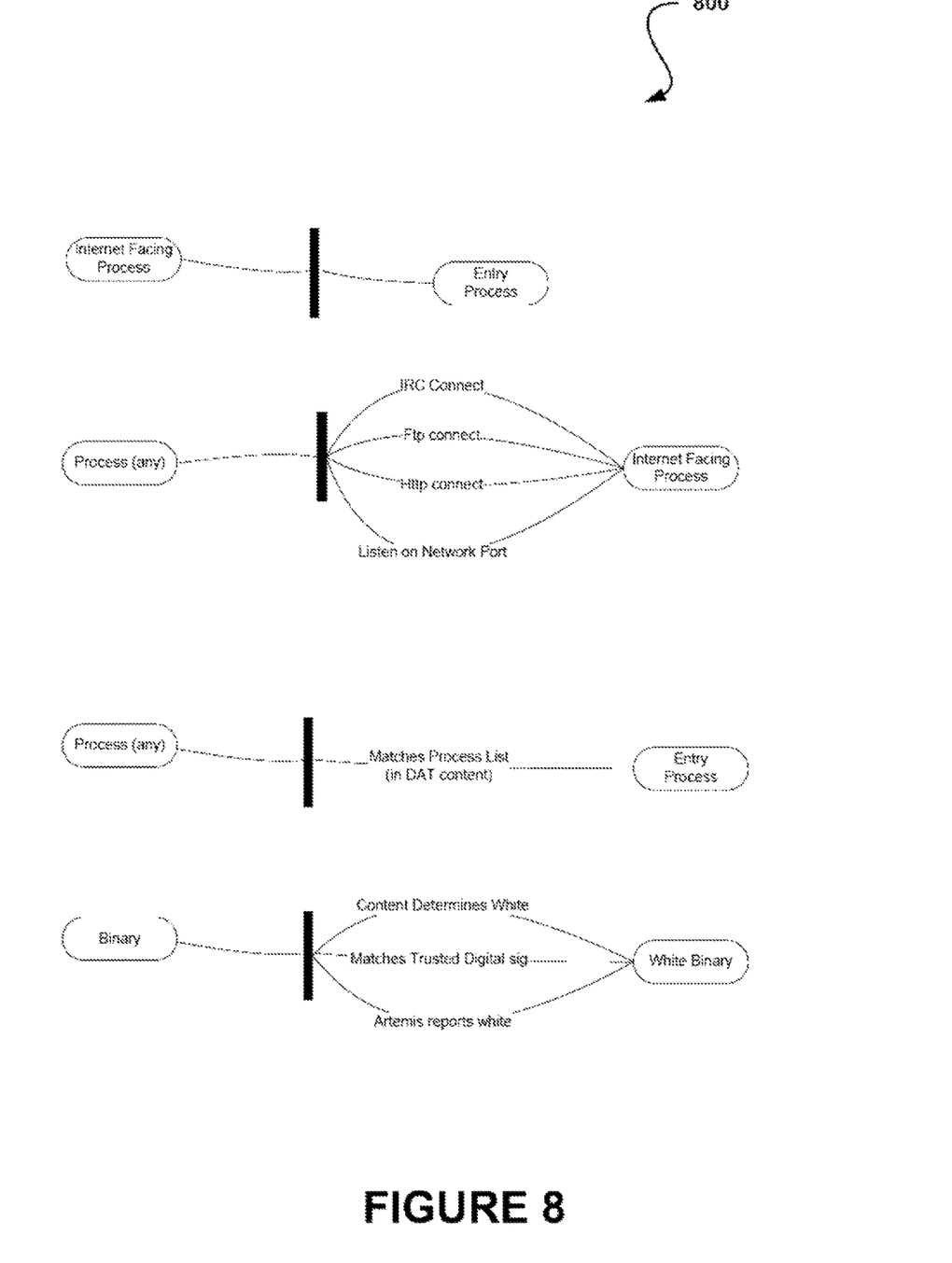
FIG. 8 shows exemplary state rules for applying to events, in accordance with still another embodiment.

FIG. 8 shows exemplary state rules 800 for applying to events, in accordance with another embodiment. As an option, the rules 800 may be carried out in the context of the architecture and environment of FIGS. 1-7. Of course, however, the rules 800 may be carried out in any desired environment.

As shown, state rules 800 include a plurality of state rules that may, given knowledge of a trust state of a particular process or object, allow for events associated with the process or object to occur without necessitating a scan of the process or object.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A non-transitory computer readable medium, on which are stored instructions, comprising instructions that when executed cause a computer system to:
   determine whether a first file is trusted;
   monitor activity related to the first file and a second file;
   redetermine whether the first file is trusted based at least in part upon whether the second file is trusted;
   determine not to perform a scan operation on the first file responsive to both the first file and the second file being trusted;
   determine to perform a scan operation on the first file responsive to the first file being untrusted; and
   determine to perform a scan operation on the first file responsive to the second file being untrusted,
   wherein the first file comprises an executable file, and
   wherein the monitored activity indicates an action performed on the second file by execution of the first file.

2. The non-transitory computer readable medium of claim 1, wherein the instructions that when executed cause the computer system to redetermine whether the first file is trusted comprise instructions that when executed cause the computer system to determine the first file is untrusted responsive to the second file being untrusted.

3. The non-transitory computer readable medium of claim 1, wherein the monitored activity indicates an action performed on the first file by the second file.

4. The non-transitory computer readable medium of claim 1, wherein the monitored activity indicates that the second file has been loaded by execution of the first file.

5. The non-transitory computer readable medium of claim 1, wherein the instructions that when executed cause the computer system to determine the first file is trusted further comprise instructions that when executed cause the computer system to inherit a trust information from a creator of the first file.

6. A computer system comprising:

one or more processors;

memory, coupled to the one or more processors, on which are stored instructions, comprising instructions that when executed cause the one or more processors to:

determine whether a first object is trusted;

monitor activity related to the first object and a second object;

redetermine whether the first object is trusted based at least in part upon whether the second object is trusted;

determine not to perform a scan operation on the first object responsive to both the first object and a the second object being trusted;

determine to perform a scan operation on the first object responsive to the first object being untrusted; and determine to perform a scan operation on the first object responsive to the second object being untrusted, wherein the first object comprises an executable object, and wherein the monitored activity indicates an action performed on the second object by execution of the first object.

7. The computer system of claim 6, wherein the instructions that when executed cause the one or more processors to redetermine whether the first object is trusted comprise instructions that when executed cause the one or more processors to determine the first object is untrusted responsive to the second object being untrusted.

8. The computer system of claim 6, wherein the first object comprises a file.

9. The computer system of claim 6, wherein the second object comprises a process of a computer operating system.

10. The computer system of claim 6, wherein the instructions that when executed cause the one or more processors to monitor activity related to the first object and a second object comprise instructions that when executed cause the one or more processors to receive an indication that the second object has performed an action involving the first object.

11. The computer system of claim 6, wherein the instructions that when executed cause one or more processors to monitor activity related to the first object and a second object comprise instructions that when executed cause the one or more processors to determine that the second object has been acted upon by the first object.

12. A computer system comprising:

one or more processors;

a memory, coupled to the one or more processors, on which are stored instructions, comprising instructions that when executed cause one or more processors to:

establish a first trust state for a first object, comprising scanning the first object for malware;

monitor activity related to the first object and a second object;

update the first trust state of the first object based at least in part upon a second trust state associated with the second object;

determine not to perform a scan operation on the first object responsive to the first trust state and the second trust state indicating that the first object and the second object are both trusted;

determine to perform a scan operation on the first object responsive to the first trust state or the second trust state indicating the first object is untrusted; and determine to perform a scan operation on the first object responsive to the first trust state or the second trust state indicating the second object is untrusted, wherein the first object comprises an executable object, and wherein the monitored activity indicates an action performed on the second object by execution of the first object.

* * * * *

UNITED STATES PATENT AND TRADEMARK OFFICE
CERTIFICATE OF CORRECTION

PATENT NO. : 9,906,537 B2  
APPLICATION NO. : 14/595037  
DATED : February 27, 2018  
INVENTOR(S) : Spurlock et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this  
Twelfth Day of February, 2019

Andrei Iancu  
*Director of the United States Patent and Trademark Office*

UNITED STATES PATENT AND TRADEMARK OFFICE
CERTIFICATE OF CORRECTION

PATENT NO. : 9,906,537 B2  
APPLICATION NO. : 14/595037  
DATED : February 27, 2018  
INVENTOR(S) : Spurlock et al.

Page 1 of 1

It is certified that error appears in the above-identified patent and that said Letters Patent is hereby corrected as shown below:

On the Title Page

Item (*) Notice:  
Replace "315 days" with --115 days--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*